United States Patent [19]

Nagaoka

[11] 3,848,263

[45] Nov. 12, 1974

[54] RECORDING AND REPRODUCING SYSTEM WITH AUTOMATIC TAPE THREADING

[75] Inventor: Tadashi Nagaoka, Nishinomiya, Japan

[73] Assignee: Matsushita Electric Industrial Co., Ltd., Osaka, Japan

[22] Filed: Sept. 26, 1972

[21] Appl. No.: 292,323

[52] U.S. Cl. ...................... 360/83, 242/195, 360/85, 360/130

[51] Int. Cl. ...................... G11b 15/66, G11b 15/26

[58] Field of Search ............... 179/100.2 T, 100.2 Z; 242/195, 192, 198, 76, 788; 226/91, 92; 360/83, 85, 130

[56] References Cited

UNITED STATES PATENTS

| | | | |
|---|---|---|---|
| 3,150,840 | 9/1964 | Briskin et al. | 242/195 |
| 3,375,331 | 3/1968 | Okazaki et al. | 179/100.2 T |
| 3,598,926 | 8/1971 | Umeda | 179/100.2 T |
| 3,691,315 | 8/1970 | Ellmore | 179/100.2 T |

*Primary Examiner*—Alfred H. Eddleman
*Attorney, Agent, or Firm*—Stevens, Davis, Miller & Mosher

[57] ABSTRACT

A recording or reproducing system using an information storage tape provided at the pay-off end with a leader tape having a greater width and greater rigidity than the information storage tape. The system includes a selective tape guide mechanism disposed substantially in the path of both of the tapes and provides for selective paths respectively for both of the tapes.

5 Claims, 11 Drawing Figures

RECORDING AND REPRODUCING SYSTEM WITH AUTOMATIC TAPE THREADING

This invention relates to magnetic recording or reproducing systems using an information storage tape provided at the pay-off end with a leader tape having a greater width and greater rigidity than the information storage tape.

In the magnetic recording or reproducing system of the so-called auto-threading type, at the loading of the information storage tape, such as a magnetic tape, the tape end is automatically withdrawn from the pay-off reel and automatically guided along a predetermined path to the take-up reel. In this type of the recording or reproducing system, in order to ensure reliable auto-threading action it has been proposed to provide the pay-off end of the information storage tape with a leader tape less flexible than the information storage tape. By virtue of its greater rigidity, the leader tape can be comparatively easily and reliably guided along the predetermined path to the take-up reel and wound thereon, so that it can withdraw the following information storage tape from the take-up reel side for the information storage tape to be smoothly guided along the predetermined path.

In this method, however, the leader tape is likely to cause damage to transducers as it touches them due to its rigidity.

The present invention has been developed on the basis of the recognition of the above problem, and it has for one of its objects the provision of means to provide separate paths for both leader tape and information storage tape.

Another object of the invention is to provide a magnetic recording or reproducing system of the auto-threading type, in which separate paths are provided both for leader tape and for information storage tape.

A further object of the invention is to provide means to reliably insert the leader tape provided at the pay-off end of the information storage tape into a leader tape guide which can guide only the leader tape.

The above and other objects of the invention will become more apparent from the following description with reference to the accompanying drawings, in which.

Figure 1:
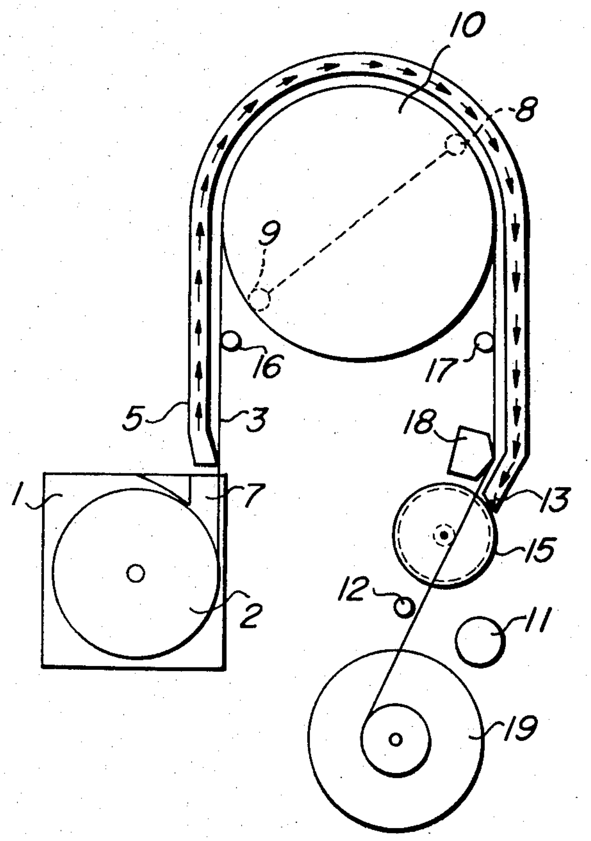
FIG. 1 is a plan view showing an embodiment of the invention.

Referring now to FIG. 1, which shows an embodiment of the invention, reference numeral 1 designates a tape cassette accommodating a pay-off reel 2. It can be removably loaded in the magnetic recording or reproducing unit. When the tape cassette 1 is loaded, the pay-off reel 2 is coupled to a reel drive means (not shown) which provides a predetermined drive force to the reel at a desired time. An information storage tape 3 for recording or reproduction is wound on the pay-off reel 2.

Figure 2:
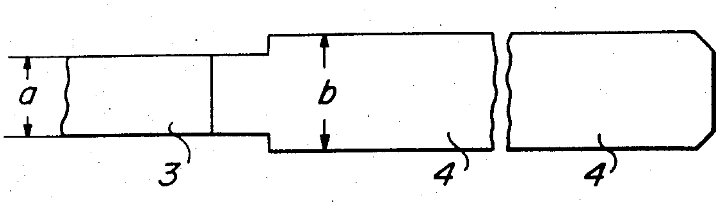
FIG. 2 is a plan view, partly broken away, showing an example of the leader tape employed in accordance with the invention.

As shown in FIG. 2, the tape 3 is provided at its pay-off end with a leader tape 4 having a width b greater than the width *a* of the recording or reproducing tape and being less flexible compared thereto.

Figure 3:
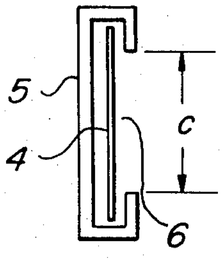
FIG. 3 is a sectional view showing a leader tape guide.

Reference numeral 5 designates a leader tape guide, which is an elongated member having a substantially C-shaped cross section as shown in FIG. 3. The guide 5 has an elongated opening or slot 6, which extends throughout the length of the guide and has a width *c* greater than the width *a* of the information storage tape 3 but smaller than the width *b* of the leader tape 4. As shown in FIG. 1, the leader tape guide 5 has one end disposed in the vicinity of tape inlet-outlet 7 of the tape load cassette 1, an intermediate arcular portion surrounding a cylindrical tape guide drum 10 having a rotary head assembly 8, 9 for a peripheral portion of the drum subtending an angle of substantially 180° and slightly spaced from the drum, with the slot 6 facing the periphery of the drum, and the other end 13 disposed in the vicinity of a tape drive means consisting of pinch roller 11 and a capstan 12.

Figure 4:
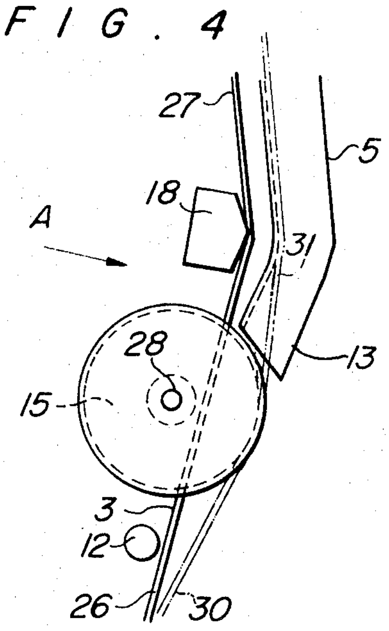
FIG. 4 is a fragmentary plan view, to an enlarged scale, showing part of the embodiment of FIG. 1.
Figure 5:
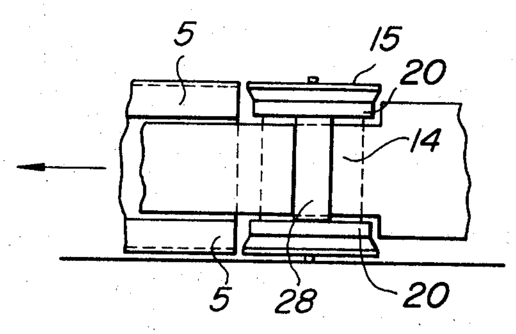
FIG. 5 is a side view, in the direction of arrow A, of part of the FIG. 4 embodiment.

As is most clearly shown in FIGS. 4 and 5, adjacent to the other end 13 of the leader tape guide 5 is disposed a rotary member 15 provided with a central depression or groove 14 having a width greater than the width *a* of the information storage tape 3 but smaller than the width *b* of the leader tape 4.

In FIG. 1, reference numerals 16 and 17 designate guide posts to guide the information storage tape 3 passed round the guide drum 10, and numeral 18 a transducer for sound and control signals. Numeral 19 designates a takeup reel, which protects the end of tape supplied and on which the tape is wound in the usual manner.

With the construction described above, at the time of loading the tape by rotating the pay-off reel 2 the leader tape 4 is first fed through the inlet-outlet 7 to the leader tape guide 5. The leader tape 4 being fed is guided through the leader tape guide 5 and gets out of it at its end 13. When it comes out of the leader tape guide 5, the leader tape 4 is guided by flange-like end portions 20 of the rotary member 15 on opposite sides of the depression 14, for its width is greater than the width of the depression 14 as shown in FIG. 5, before it is taken up by the take-up reel.

As the leader tape 4 is being taken up, it pulls and withdraws the following magnetic tape 3. Since the information storage tape 3 is narrower than the slot 6 of the leader tape guide 5, it gets off the guide 5 and proceeds round guide post 16, guide drum 10 and guide post 17, as shown by the solid line in FIG. 1. As the tape 3 comes to the rotary member 15, it gets in the depression 14 thereof, as shown by lines 27 and 26 in FIG. 4, so that it gets into contact with the transducer 18. When this state is brought about, the information storage tape 3 is driven at a predetermined speed by the capstan 12 and pinch roller 11 for recording or reproduction with revolving heads 8 and 9 of the head assembly and transducer 18.

At the time of re-winding, while the information storage tape 3 follows the path shown by 26 and 27 in FIG. 4, the leader tape 4 encounters and rides on the end portions 20 of the rotary member 15 to follow a path shown by 30 and 31 in FIG. 3, so that it is guided through the leader tape guide 5 and re-wound on the pay-off reel 2 without touching the transducer 18, guide drum 10 and guide posts 16 and 17.

The depression 14 of the rotary member 15 may be made deep enough to ensure that the magnetic tape 3 getting in it will not touch the central portion 28 of the rotary member 15. By so doing, the rotary member 15 will have no effects on the progress of the information storage tape 3 at the time of recording or reproduction, so that no particularly high precision nor any particular care is required in the manufacture and assemble of the rotary member 15.

Figure 6:
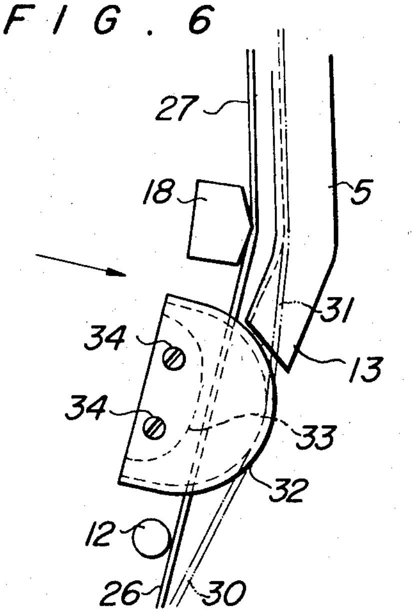
FIG. 6 is a plan view showing another embodiment of the invention.
Figure 7:
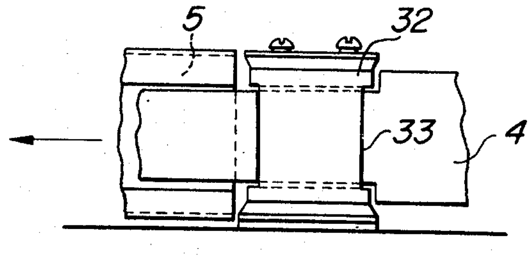
FIG. 7 is a side view, in the direction of arrow A, of part of the FIG. 6 embodiment.

FIGS. 6 and 7 show a modification of the above embodiment in which a stationary guide means is employed in place of the afore-mentioned rotary member 15.

More particularly, the stationary guide means consists of a semi-cylindrical member 32 provided with a central arcular depression 33 which is broader than the information storage tape 3 and narrower than the leader tape 4. Similar to the previous embodiment, the guide means is disposed adjacent to the end 13 of the leader tape guide 5 and secured by bolts 34 to a frame not shown.

In this embodiment, like the previous embodiment, the information storage tape 3 can completely get out of the leader tape guide 5, so that it is possible to obtain steady and stable tape travel without the edges of the information storage tape touching the leader tape guide 5.

FIGS. 8 to 11 show a way of removably attaching the afore-described leader tape guide through an attachment metal provided with a selective tape guide means to the body of the recording or reproducing system.

Figure 8:
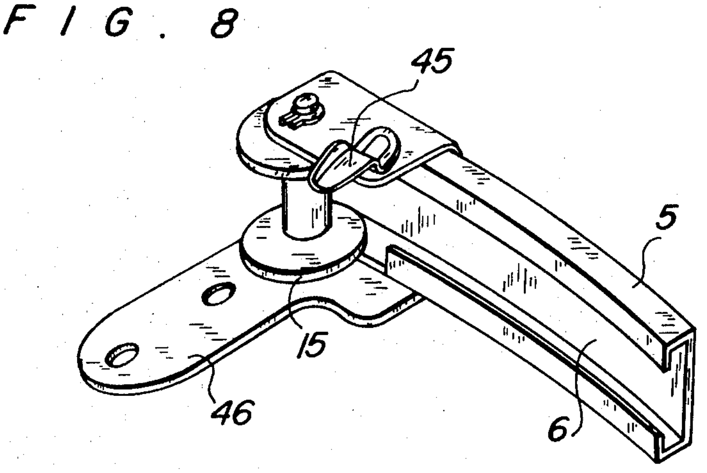
FIG. 8 is a fragmentary perspective view showing a third embodiment of the invention.
Figure 9:
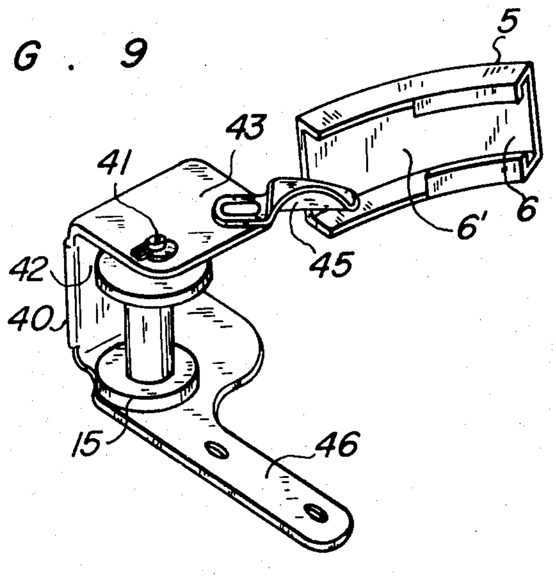
FIG. 9 is an exploded perspective view of the same.

As shown in FIG. 9, a channel-shaped attachment metal 40 supports a pin 41, on which the selective tape guide means, that is, a rotary member 15 having a central depression 14 is rotatably mounted. A leader tape guide 5 having a slot 6 terminating in an increased width end slot 6' wider than the leader tape 4 is inserted between an intermediate wall portion 42 of the channel-shaped attachment metal 40 and the rotary member 15 such that the end slot 6' faces the rotary member 15, as shown in FIG. 8.

Figure 10:
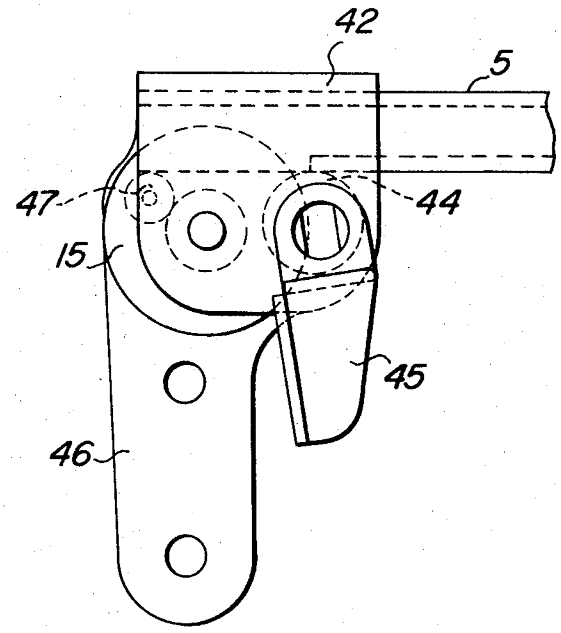
FIG. 10 is a plan view of the same.

Extending underneath the upper side portion 43 of the attachment metal 40 is an eccentric cam 44, which is mounted to the attachment metal such that it can be rotated by rotating an arm 45. After inserting the leader tape guide 5, the arm is rotated so that the eccentric cam 44 clamps the leader tape guide 5 against the wall 42 of the attachment metal, as shown in FIG. 10.

Figure 11:
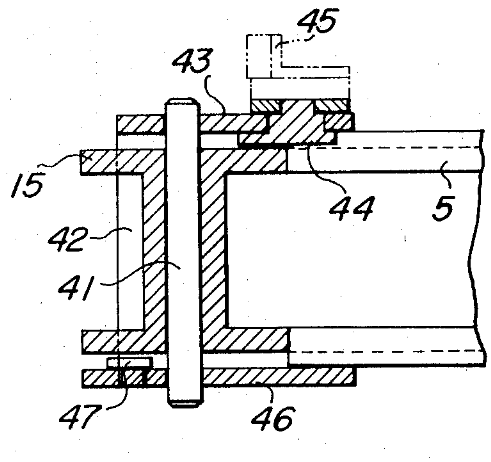
FIG. 11 is a side view of the same.

The rotary member 15 can rotate in contact with the excentric cam 45 and a circular member 47 provided to the lower portion 46 of the attachment metal without touching the upper and lower portions 43 and 46 thereof, as shown in FIG. 11.

After securing the end of the leader tape guide 5 to the attachment metal 40, the lower portion 46 thereof is secured to the frame by means of bolts. In this way, the leader tape guide 5 can be attached to the frame in a predetermined position relative to the rotary member 15, so that the assemblage and adjustment can be facilitated.

What we claim is:

1. In a magnetic recording or reproducing system including a pay-off reel having a winding of magnetic tape whose leading end is attached to a leader tape having a rigidity and width greater than that of the magnetic tape; means for rotating said pay-off reel to transport said leader tape, means for defining a magnetic tape traveling way of a circular arc like form, a take-up reel for taking up the leader tape and magnetic tape, a leader tape guide means disposed along and outside of said circular arc traveling way and having along its length a first slot for sliding therethrough said leader tape, said leader tape guide means having an opening along said length and inside of said tape guide means to face said traveling way, said opening having a width greater than the magnetic tape but smaller than said leader tape whereby the latter must travel through said first slot but the former can be brought thereout, and said guide means having one end portion positioned in the vicinity of said pay-off reel and the other end portion positioned in the vicinity of said takeup reel for receiving said leader tape or sending the same out of said first slot, said traveling way dedining means including guide posts and magnetic heads positioned opposite to said opening to be in contact with the magnetic tape brought out through said opening; the improvement comprising means for changing the way of tape travel, said changing means having an outer peripheral surface portion shaped with a small curvature, said surface portion further having a second slot portion of width greater than the magnetic tape but smaller than said leader tape, said changing means being positioned with said surface portion positioned in the vicinity of said other end portion and opposite to the opening of said guide means, said changing means projecting outside of said magnetic tape traveling way and with said small curvature portion positioned on the way of travel of said leader tape sliding through said first slot for guiding said leader tape, wherein when said leader tape comes out of said first slot of said guide means and is guided on said small curvature portion the magnetic tape is caused to go out through said opening of said guide means to travel on said magnetic tape traveling way.

2. In a magnetic recording or reproducing system according to claim 1 wherein said travel way changing means comprises a rotary member having said outer peripheral surface portion provided with said second slot portion.

3. In a magnetic recording or reproducing system according to claim 1 wherein said travel way changing means comprises a stationary member having said outer peripheral surface portion provided with said second slot portion.

4. In a magnetic recording or reproducing system according to claim 1 wherein said second slot portion has such a depth that said magnetic tape being guided passed said changing means will not touch said changing means.

5. In a magnetic recording or reproducing system according to claim 1 wherein said leader tape guide means has one end removably attached to an attachment means provided with said changing means, said attachment means being secured to a frame of the system.

* * * * *